United States Patent [19]
Campanile

[11] Patent Number: 5,339,947
[45] Date of Patent: Aug. 23, 1994

[54] SCRAPING DEVICE FOR BELT CONVEYORS

[76] Inventor: Luigi Campanile, Via Manganario No. 51, 84100 Salerno, Italy

[21] Appl. No.: 95,756
[22] Filed: Jul. 21, 1993
[51] Int. Cl.⁵ .............................................. B65G 45/00
[52] U.S. Cl. ...................... 198/499; 15/256.6
[58] Field of Search .............. 198/497, 499; 15/256.5, 15/256.51, 256.6

[56] References Cited

U.S. PATENT DOCUMENTS

| | | | |
|---|---|---|---|
| 4,105,109 | 8/1978 | Schultz | 198/499 |
| 4,344,525 | 8/1982 | Bancroft et al. | 198/499 |
| 4,836,356 | 6/1989 | Mukai et al. | 198/499 |
| 4,915,211 | 4/1990 | Dohmeier | 198/499 |
| 5,213,197 | 5/1993 | Mohri | 198/499 |

FOREIGN PATENT DOCUMENTS 826420 1/1952 Fed. Rep. of Germany ...... 198/499
2040249 8/1980 United Kingdom ................ 198/499

*Primary Examiner*—D. Glenn Dayoan
*Attorney, Agent, or Firm*—Helfgott & Karas

[57] ABSTRACT

A device formed by a plurality of metal cores having at the top hard metal scraper bits, in which the cores are parallel to each other but are not in contact with each other. The cores are embedded in a one-piece block of polyurethane, rubber or other elastomeric material, connected to a positioning shaft by a housing pocket, and placed close to a belt conveyor drum. In order to automatically compensate for wear of the scraper bits, the positioning shaft is connected to the conveyor by an elastic suspension and a pair of hinge joints fixed to side brackets placed on a frame. The arrangement for securing the block to the housing pocket causes an upward bending thereof, thus forcing the embedded cores and therefore the scraper bits to be arranged along an imaginary broken line tangent to the block bending.

12 Claims, 7 Drawing Sheets

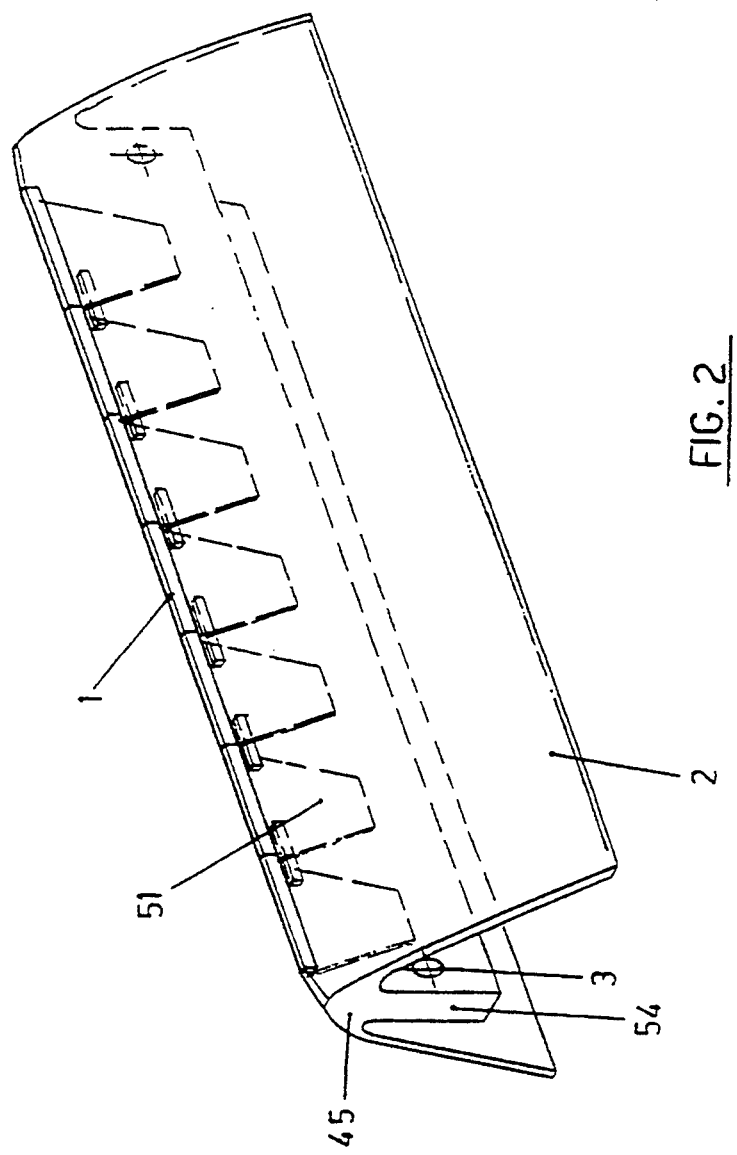
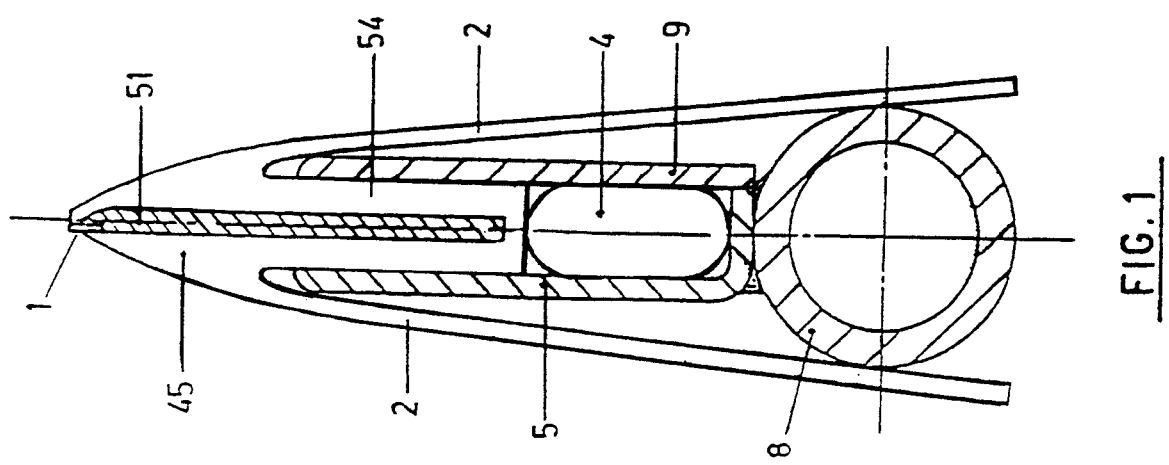

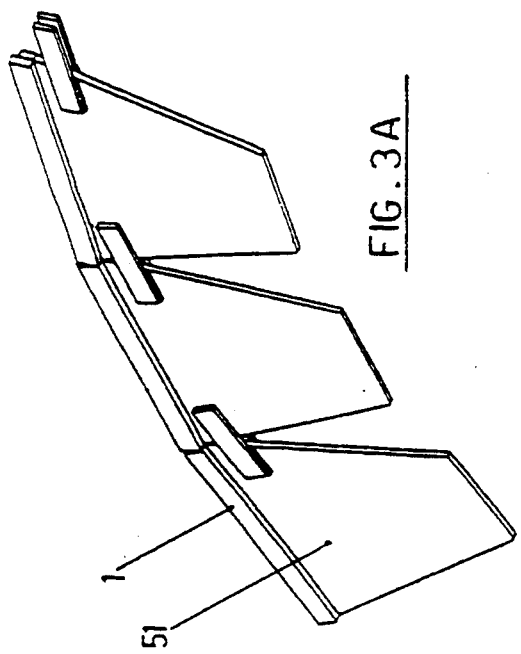
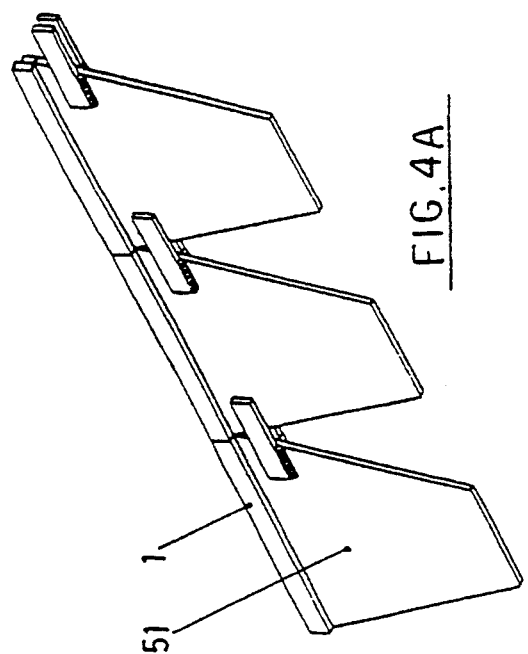
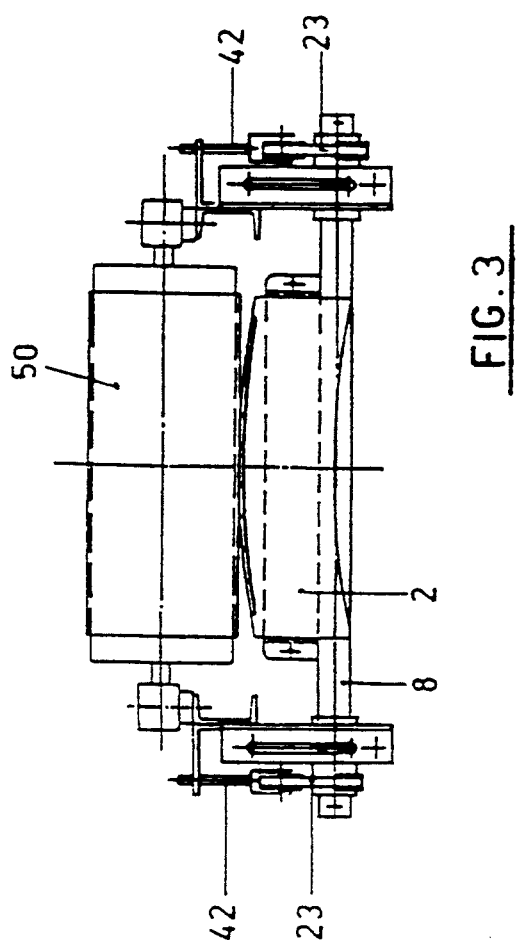
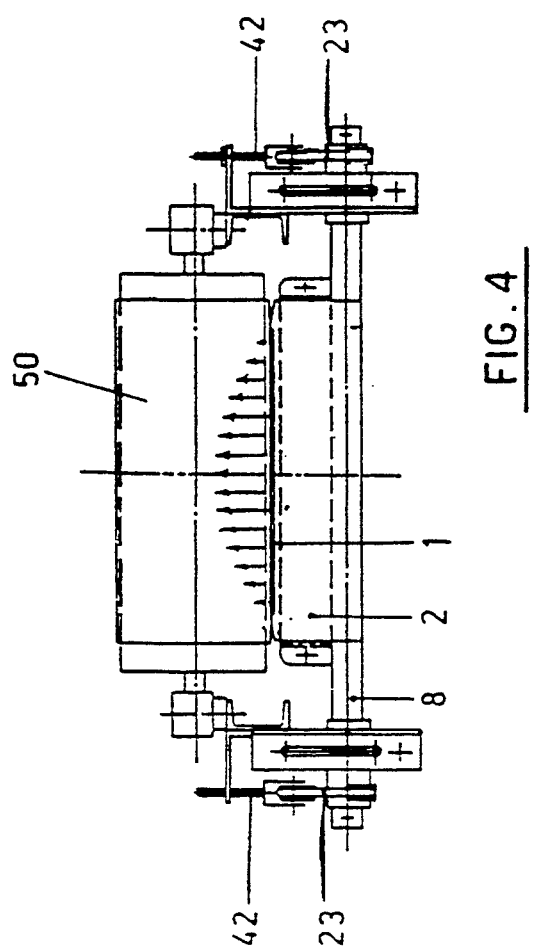

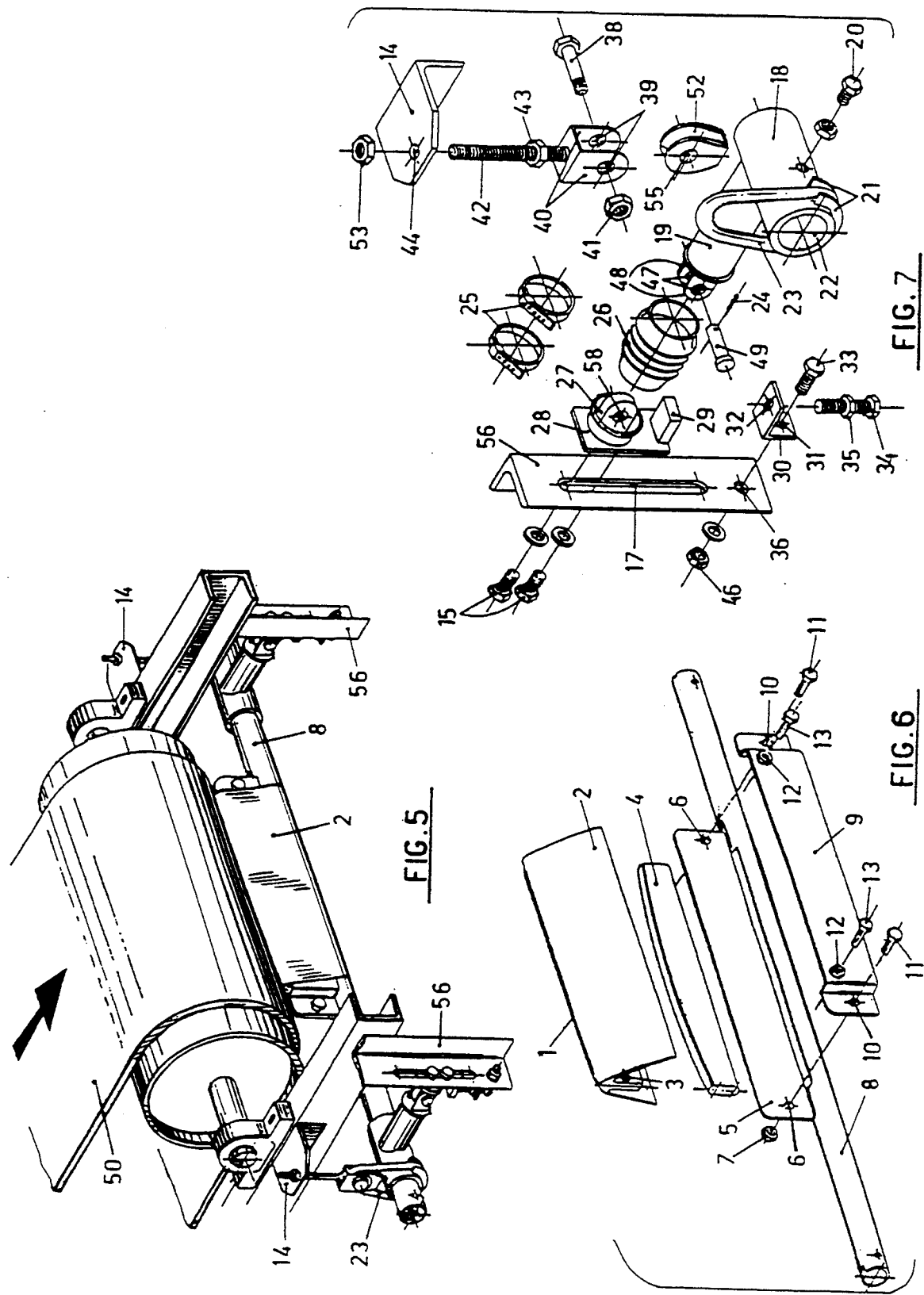

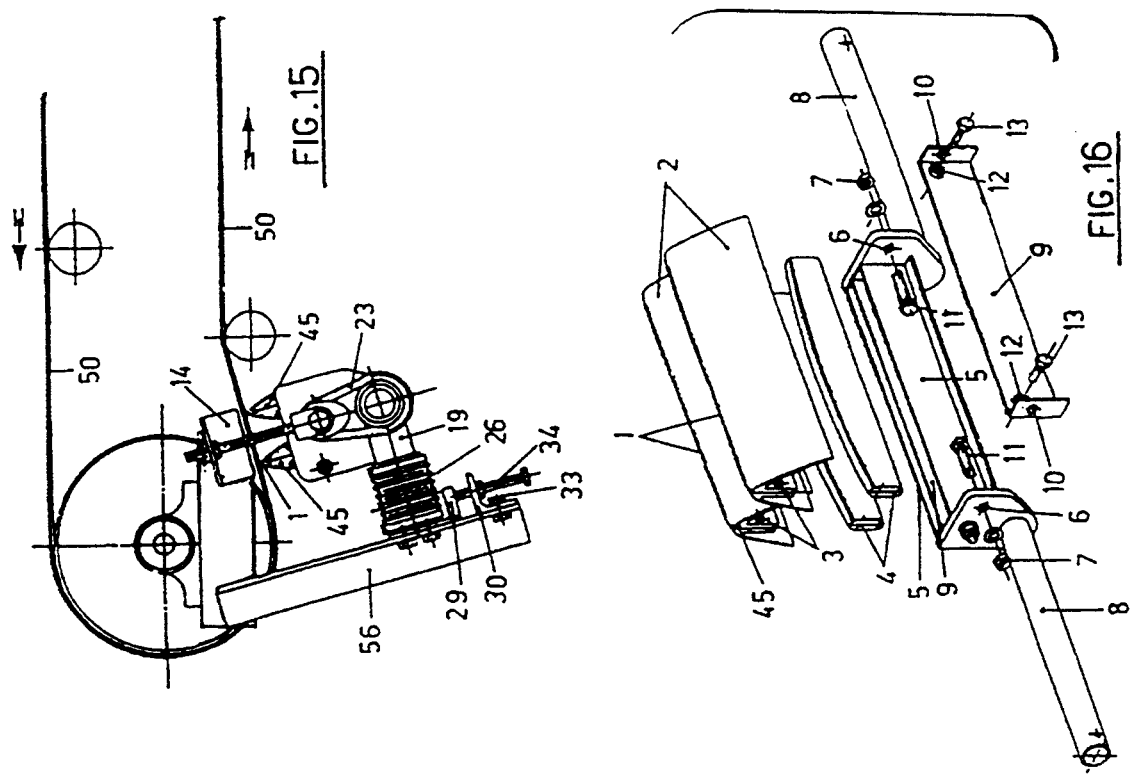
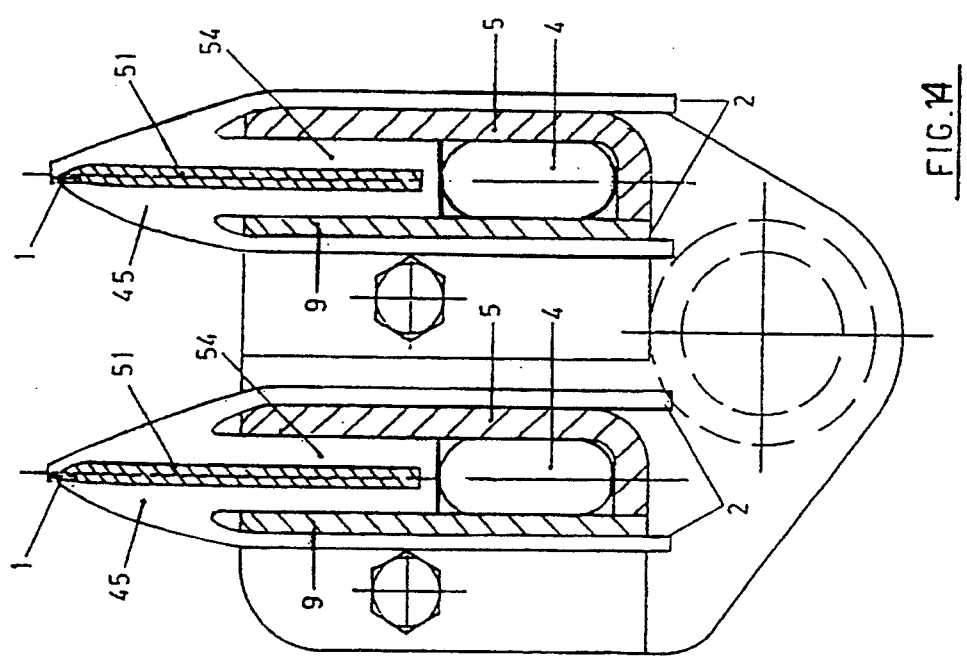

SCRAPING DEVICE FOR BELT CONVEYORS

BACKGROUND OF THE INVENTION

The present invention relates to a device for scraping the surface of belt conveyors.

It is known that more or less thick deposits accumulate over the surfaces of belt conveyors, depending on the stickiness of the conveyed materials.

Presently the most common devices used for cleaning the belt surface include scrapers substantially formed by a plurality of plates carrying blade-shaped scrapers—usually of steel—at the ends contacting the belt, to remove the material accumulated over the belt by means of a scraping action.

The scrapers or cleaning devices actually on the market are generally provided with plates each pivotally mounted on rubber springs, and this arrangement results in a quick deterioration of their elastic properties because of the hysteresis of the elastomeric material they are made of, when the belt operating speed is faster than 3 m/s.

Moreover in all cases the blades and the associated elastic members are carried by a pipe rigidly connected to the conveyor frame, thus requiring interventions for adjusting the whole system as the scrapers wear out.

The object of the present invention is that to overcome said shortcomings by providing a decidly more convenient and rational scraping device, that does not require particular and frequent adjustments, said device being further provided with scraping members capable of automatically self-adjusting and continuously adapting themselves to the belt conveyor moving surface.

In case of reversible belts, it is known that the existing scrapers for such belts do not allow for an automatic disengagement of the scraping devices which continue to operate and therefore wear out the scraper members when the running direction of the belt is reversed.

It is quite common the case in which a cleaning action is required on the upper surface of the belt lower (or return) section in order to intercept also the material that has fallen down from the transporting section.

In some cases, it may be desirable that two scraping devices are located in series on the same scraper for an increased cleaning action.

SUMMARY OF THE INVENTION

The scraping device for belt conveyors according to the present invention provides therefore for four main embodiments that although employing the same inventive idea, differ from each other for some specific features due to the different requirements of the above mentioned conveyors.

The scraping device for belt conveyors according the present invention substantially comprises a one-piece block of polyurethane, rubber or other elastomeric material inside which a plurality of sustantially metal cores are embedded that are located in parallel but not in contact with each other, the tops of which carry hard metal bits, said cores not extending for the whole length of the block, thus forming two ends thereof comprising only elastomeric material; the top portion of said block having an ogival shape extending downward into a central body and laterally into two protecting portions; each of said two ends being provided in correspondence of the central body with a hole for securing the block to the side frame of a fastening pocket; the lower edge of the block pressing on an underlying resilient pad of elastomeric material; said pad having an upwardly curved upper profile; the inclination of the block with respect to the belt to be scraped being adjustable by rotating the positioning shaft in recesses of the bushes and locking it by screws, said bushes being elastically suspended through elastomeric springs to supporting brackets; the connection between the suspension and the supporting bracket comprising timbles connected integral with the by forks screws and nuts; a preloding of the springs being achieved by tightening nuts at the top of the supporting brackets, on the threaded shaft of the forks inserted into corresponding holes; the path on which the shaft is driven being determined by the presence of articulated arms provided on said bushes and carrying on the opposite ends forks connected with projections by pins and split pins inserted in the holes provided thereon, thus forming pivot hinges; said hinges being protected by bellows of rubber or other elastomeric material, mounted at the two ends of each hinge by means of straps; said hinges being integral with slides that are adjustable by loosening screws within slots provided in side brackets connecting the conveyor frame; the hinge adjustment being achieved by tightening register screws in threaded holes on the brackets, the ends of the screws acting on the brackets that are integral with the slides; said brackets being connected to the side brackets by screws inserted in the holes and tightened by nuts and washers.

A main characteristic of the present invention resides in the way the block carrying the scraper bits is fixed to the housing pocket together with the presence of the underlying resilient pad with an upward curved top edge forcing the block to be bent upwardly, whereby the block and the scraper bits embedded therein are arranged along a broken line tangent to the curve itself; the return to the straight configuration of the block when it is pressed against the belt by the springs of the side suspension allowing the scraper bits to apply an increased pressure in the belt central area, and therefore to improve the scraping action in the area which is more prone to become dirty; the resilient pad working as a cushion for the block and allowing the scraper bits to adjust themselves to possible belt roughness or deformations.

A further characteristic of the present invention is that thanks to the presence of the hinges and the corresponding articulated arms, the positioning shaft is swingable and cushioned by the resilient suspension along a circular path with center at the hinges axis and radius equal to the distance between the hinges axis and the bushes axis, whereby the interactions between the scraping device and the belt are elastically damped.

Another further characteristic of the present invention resides in that the preloading of the springs allows for the automatic and continuous adjusting to the wear of the scraper bits.

In the scraping device according to the second embodiment, i.e. for reversible belts, the shaft positioning the block in the recesses of the bushes which are elastically suspended by elastomeric springs, is secured to frames provided with sliding guides of a low friction material, and in that rolls located between levers and connected thereto by screws and bolts are provided for preventing the turn over of said positioning shaft; said levers being pivotally connected to torsion springs by means of screws and nuts; the scraper disengagement from the belt surface and the subsequent return to the standard working position being obtained by rolls inserted between the levers and connected thereto by screws and nuts; the lower ends of said levers being integral with the springs of rubber or other elastomeric material; the lateral movements of said bushes being prevented by protruding stake acting on the lateral edges of the frame.

In the scraping device according to the third embodiment:, i.e., for exerting a cleaning action on the upper surface of the lower or return section of the belt, the shaft carrying the blade-holder pocket is mounted on said section of the belt forming an angle with respect to the longitudinal axis thereof whereby the scraped material is laterally removed from the belt.

In the scraping device according to the fourth embodiment the scraping head is formed by two scraping units placed in series, each formed by a block of polyurethane, rubber or other elastomeric material, inside which a plurality of cores are embedded as described and claimed for the previous embodiments; said head being connected to the belt as illustrated with respect to the first embodiment.

The invention will be now described in detail referring to the accompanying drawings that are supplied as a non limiting example.

BRIEF DESCRIPTION OF THE DRAWINGS

FIG. 1 is a cross-section view of the device taken in correspondence of the elastic one-piece block with the associated housing pocket and positioning shaft;

FIG. 2 is a perspective view of the elastic block with metal cores, scrapers, end elastic hinges and protection portions, showing the bending of the elastic block and of the scraping cores when the side tensioning device is not operative;

FIG. 3 is front view showing the bending of the elastic block and of the scrapers when the tensioning device is not operative;

FIG. 3A is a partial perspective view illustrating the cores and scrapers arrangements under the conditions shown in FIG. 3;

FIG. 4 is front view showing the bending of the elastic block and of the scrapers, as well as the related pressures exerted by these latter on the belt when the tensioning device is operative;

FIG. 4A is a partial perspective view illustrating the cores and scrapers arrangements under the conditions shown in FIG. 4;

FIG. 5 is a complete prospective view of the invention as applied to the conveyor frame;

FIG. 6 is an exploded view showing the positioning shaft, the housing pocket, the resilient pad and the scraper-holder one-piece block;

FIG. 7 is an exploded view of a conveyor side connection bracket with a sliding slot for the hinge and the associated register screw, hinge and protection bellows, articulated arm and elastomeric spring with tensioning device;

FIG. 14 is a cross-section view of the device of the invention according to a fourth embodiment, taken along the axis of the parallel resilient blocks, with the housing pockets and the positioning shaft;

FIG. 15 is a side view of the device shown in FIG. 14 as applied to the conveyor frame;

FIG. 16 is an exploded view of the device of FIG. 14 showing the positioning shaft, the housing pockets, the resilient pads and the one-piece blocks carrying the scrapers.

DESCRIPTION OF PREFERRED EMBODIMENTS

Figure 8:
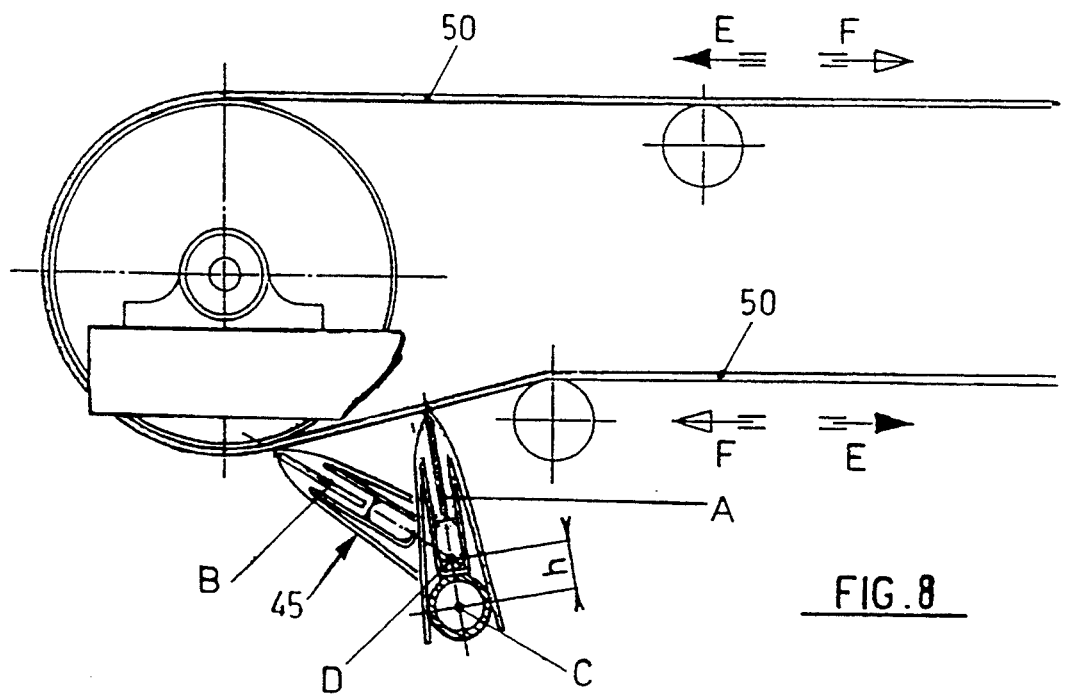
FIG. 8 is a schematic side view of the device of the invention according to a second embodiment thereof, i.e., for reversible belts.

As it is clear from the drawings, the scraping device for belt conveyors according the first embodiment substantially comprises a one-piece member or block 45 of polyurethane, rubber or other elastomeric material inside which block there is provided a plurality of metal cores 51 that are parallely located but not in contact with each other, on the tops of which hard metal bits 1 have been tipped.

The cores 51 do not extend for the whole length of the block, thus forming two ends thereof comprising only elastomeric material where two holes 3 are respectively provided.

In fact the top portion of the block 45 has an ogival shape extending downward into a central body 54 and laterally into two shield portions 2. More particularly, the two holes 3 in the elastomeric material allow for the insertion of pins 13 which are screwed to nuts 12 that are in turn welded to the removable side frame 9 of a pocket 5, and allow to clamp the block 45 to the pocket itself with two simple elastic hinges.

When the side frame 9 is fastened to the pocket 5 by means of screws 11 inserted into holes 10 and 6 and tightened by corresponding nuts 7, the block 45 is forced to assume the profile of the top edge of an underneath resilient pad 4.

The pocket 5 connects the block 45 to the positioning shaft 8.

It is clear that said connection, although being of resilient type, allows for a well defined positioning of the block 45 on said shaft 8, and therefore an accurate positioning with respect to the conveyor belt 50.

The ends of the positioning shaft 8 are inserted in suitable recesses 22 of two side bushes 18 and after the installation has been accomplished, the shaft will be rotated until the blade plane is normal to the surface to be scrapped. Finally the shaft 8 will be fixed within the bushes 18 by means of suitable set screws 20. The bushes 18 are integral with arms 19 provided at their ends with forks 48 connected to projections 27 by means of pins 49 inserted in holes 47 and 58 of said forks 48 and of said projections 27, and hold in their position by split pins 24.

The resulting hinged joint, that is essential to this first type of scraper, is protected by suitable bellows 26 of rubber or other elastomeric material, the ends of which are clamped to the two parts forming the hinge by straps 25.

The projections 27 are integral with slides 28 capable of sliding within slots 17 for positioning the hinges in respect of the belt, such slots being formed in side brackets 56 connecting the device with the conveyor frame.

The shifting of the slides 28 in the slots 17 is carried out by means of register screws 34 after loosening the screws 15 that fix the slides 28 to the holders 56. In fact, said screws 34, after loosening the nuts 35, can be rotated in threaded holes 32 drilled in the brackets 30 which in turn are connected to the side brackets 56 by screws 33 inserted into the holes 31 and 36 and tightened by the corresponding nuts. When the screws 34 are tightened they act on the brackets 29 that are integral within the slides 28, causing the sliding thereof in the slots 17. The bellows 26, of rubber or other elastomeric material, are connected to the two ends of each hinge by means of straps 25 in order to protect the joints from external causes that could hinder the free rotation thereof.

Suitably shaped guides 21 provided at the ends of the bushes 18 receive suspension springs 23 of rubber or other elastomeric material. For each bush, the tipper portion of the spring 23 is located in the groove 52 of a suitable thimble to which the fork 40 is connected by the screw 38 inserted through the holes 39 and 55 and screwed down by a nut 41.

The threaded end 42 of said fork 40 is inserted into a hole 44 of the upper support bracket 14 and connected thereto by a nut 53.

After tightening the nuts 53, thus preloading the springs 23 until a desired pressure between the scrapers and the conveyor surface to be cleaned is obtained, a nut 43 on the lower face of the support bracket 14 is tightened for preventing the displacement of the parts.

FIG. 1 shows a cross-section of the block 45.

As can be seen, by fixing the block 45 and the pocket 5 together as shown, and thanks to the presence of the resilient pad 4, the bits 1 of the scraper are able to elastically accomodate any possible and casual irregularities on the surface to be scraped and to exert a pressure that increases from the side ends to the belt middle portion, as shown in FIGS. 3 and 4.

FIG. 5 shows the invention as applied to the end section of a belt conveyor.

In FIG. 7 there is shown the elastic suspension supporting the shaft 8 carrying the scraper from the support bracket 14, to be connected to the carpentry of the belt conveyor, such suspension comprising springs made of rubber or other elastomeric material instead of metal, for the purpose of preventing a rapid corrosion in a chemical aggressive environment.

It is pointed out that said elastic suspension between the shaft 8 and the conveyor, unlike a rigid connection, allows for the automatic and continuous upward adjusting of the shaft 8, thanks to the rotations of the shaft with respect to the hinges under the preloading force applied by the springs 23, thus compensating for the blade wear without any external intervention.

Figure 9:
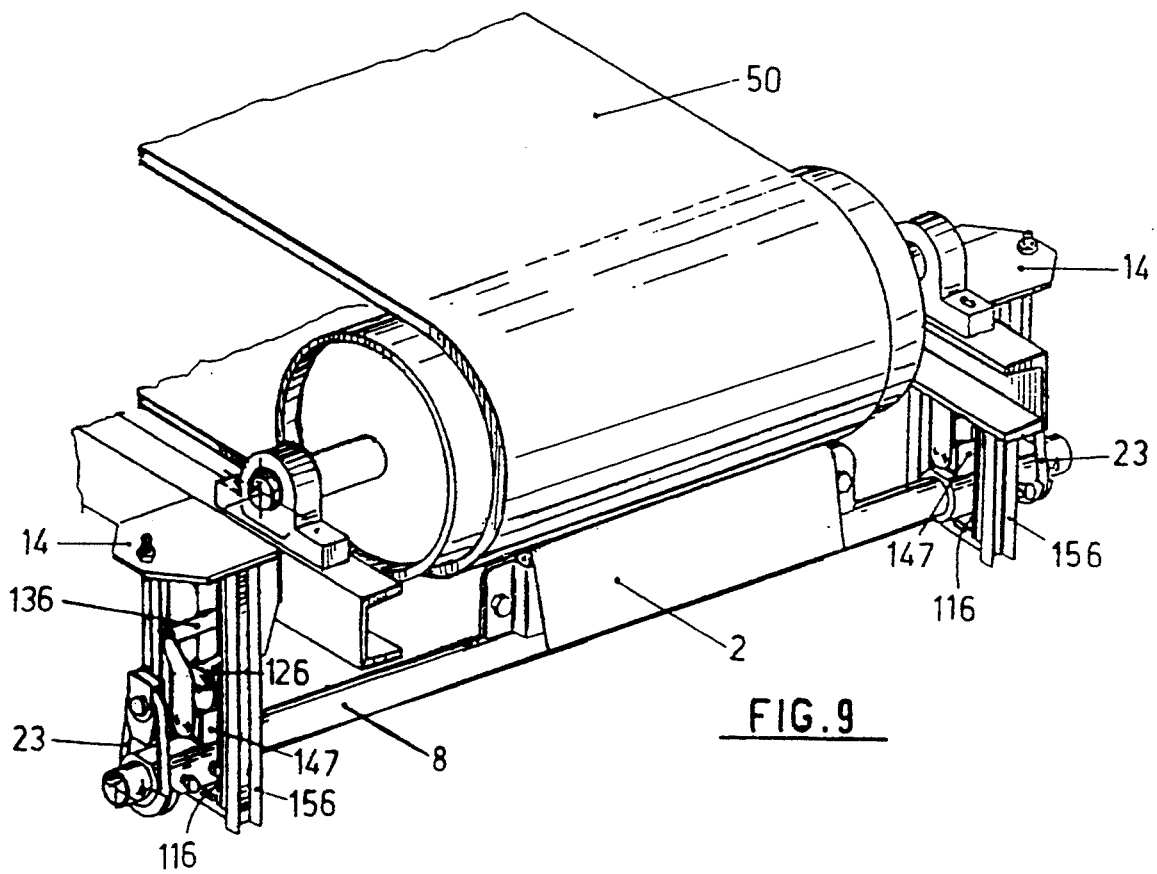
FIG. 9 is a perspective view of the device shown in FIG. 8 as applied to the conveyor frame.
Figure 10:
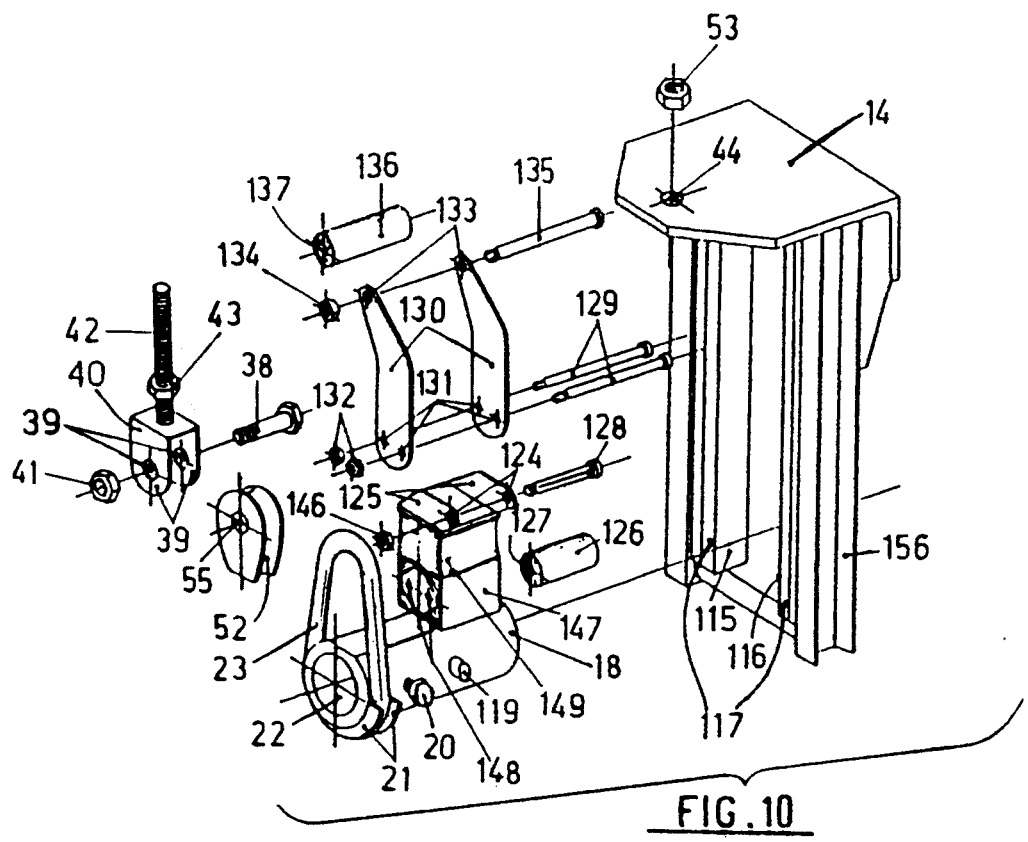
FIG. 10 is a prospective exploded view of said second embodiment showing the connection of one side frame with the conveyor, with sliding guides, bush, elastomeric spring with tensioning device, roll against turn over and associated tensioning means, and disengagement roll with associated elastic member.

A scraping device for belt conveyors according to a second embodiment of the invention, i.e. adapted for reversible belt conveyors, is illustrated in FIGS. 8, 9 and 10.

The ends of the positioning shaft 8 are inserted into the recesses 22 of the side bushes 18 and after a suitable rotation for correctly positioning the block 45 with respect to the conveyor surface 50, the position of the shaft 8 will be locked with respect to the bushes 18 by the pressure applied by the screws 20.

Each bush 18 has two pairs of levers, namely:

the levers 130 the upper ends of which carry a roll 136 for preventing a turn-over thanks to a bolt 135 passing through the holes 133 and 137 and locked by a nut 134. The lower ends of said levers 130 are pivotally connected to rubber torsion springs 147 through screws 129 inserted into holes 131 and 148 and tightened by nuts 132. It is noted that the rolls 136 push onto the guides 115 only during the belt forward running and move away from them, approaching the guides 116, during the disengagement;

the levers 125 on the upper ends of which the disengagement roll 126 is mounted through the screw 128 inserted into the holes 124 and 127 and tightened by a nut 146. The lower ends of said levers 125 are fastened to the resilient element 149, of rubber or other elastomeric material. It is noted that the rolls 126, while inactive when the belt is running forward, push onto the guides 116 only upon the disengagement caused by the reversing of the belt running. The rolls 126 and 136 together with the bushes 18 are free to move over the associated guides 115 and 116, made of low friction polyethylene (or other material), and mounted to the side frames 156 connecting the device of the invention with the carpentry of the belt conveyor.

A stake 119 protruding from each bush 18 acts on the side edges 117 of the guides of both frames 165, limiting possible side movements of the shaft 8.

FIG. 8 clearly shows the scraping block 45 applied to the conveyor belt 50 to be cleaned; more particularly it shows the block position in the operating condition, or position A (positioning shaft in C and belt running direction indicated by the black arrows E), arid the block position in the disengagement condition, or position B (positioning shaft in D and running direction indicated by the white arrows F), respectively.

From FIGS. 9 and 10 it is further clear that the elastic reactions of the rolls 126 and 136 against the corresponding sliding guides 116 and 115 allow to perform the disengagement and anti-turn over functions, respectively.

It is noted that said elastic suspension between the shaft 8 and the conveyor, unlike a fixed connection, allows for the automatic and continuous upward adjusting of the shaft 8 within the rectilinear guides 116 e 115, obtained thanks to the preloading of the springs 23, for compensating for the blade wear without any external intervention.

Figure 11:
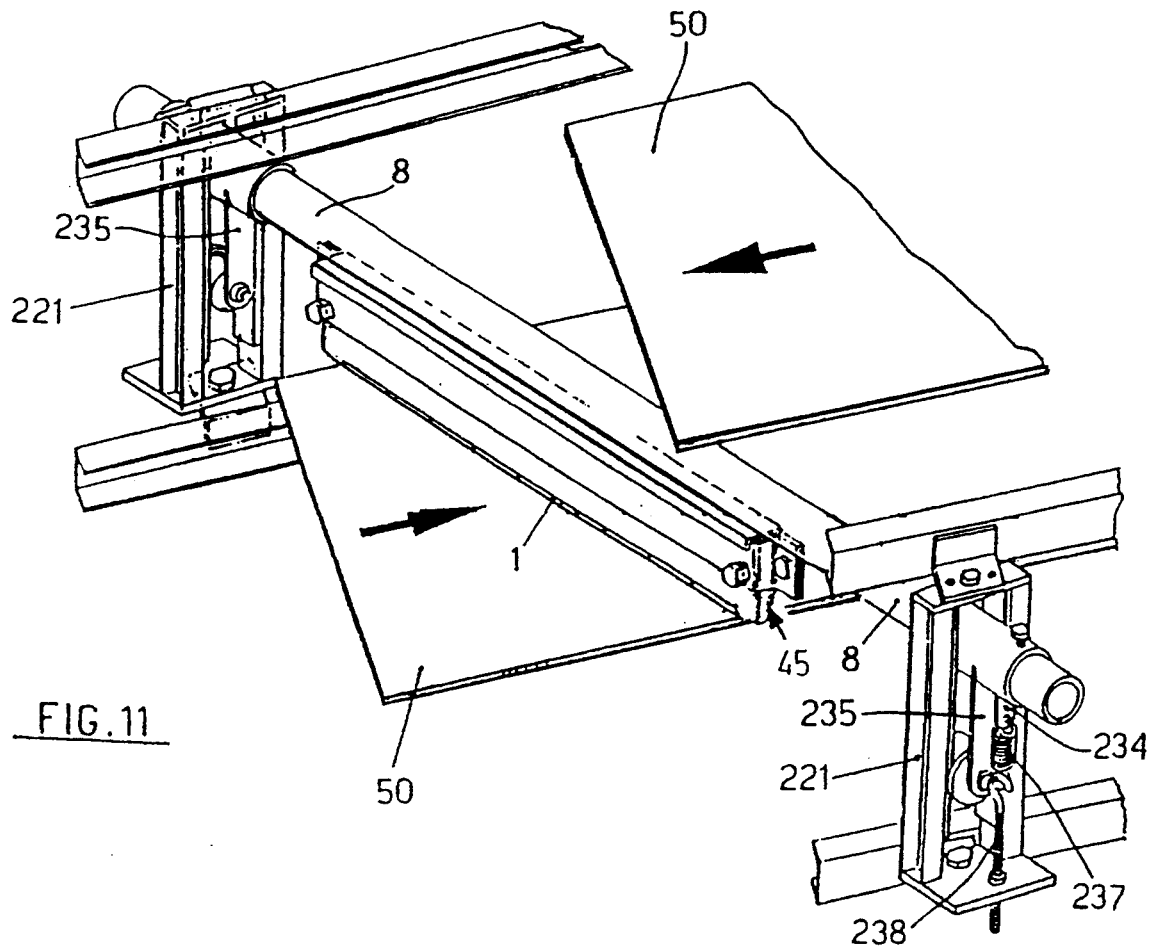
FIG. 11 is a perspective view of the device of the invention according to a third embodiment, as applied to the conveyor frame.
Figure 12:
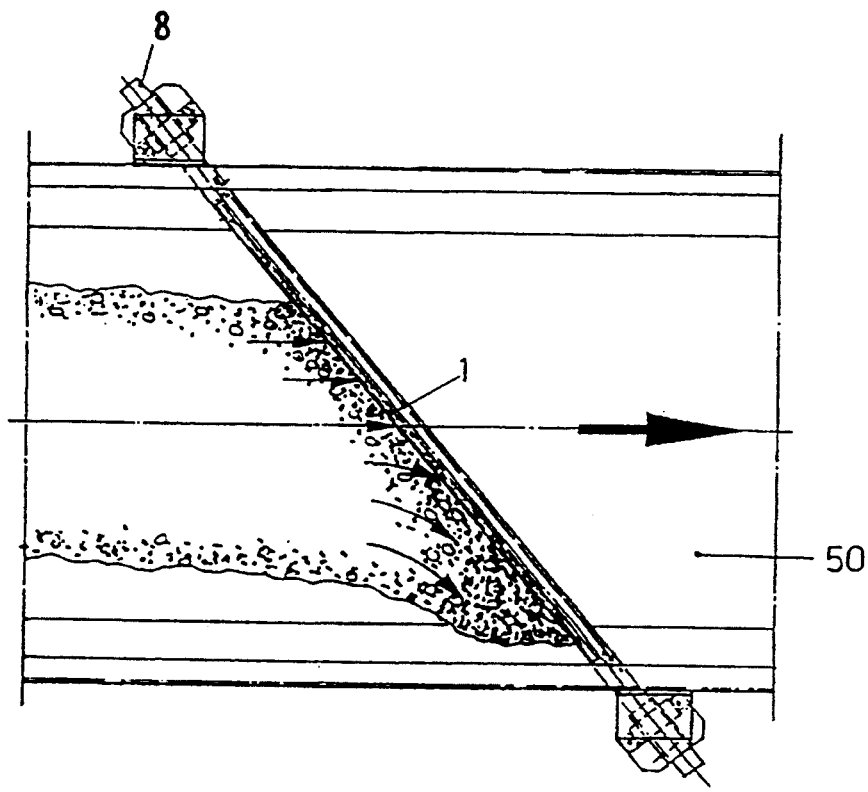
FIG. 12 is a plan view of the device shown in FIG. 11.
Figure 13:
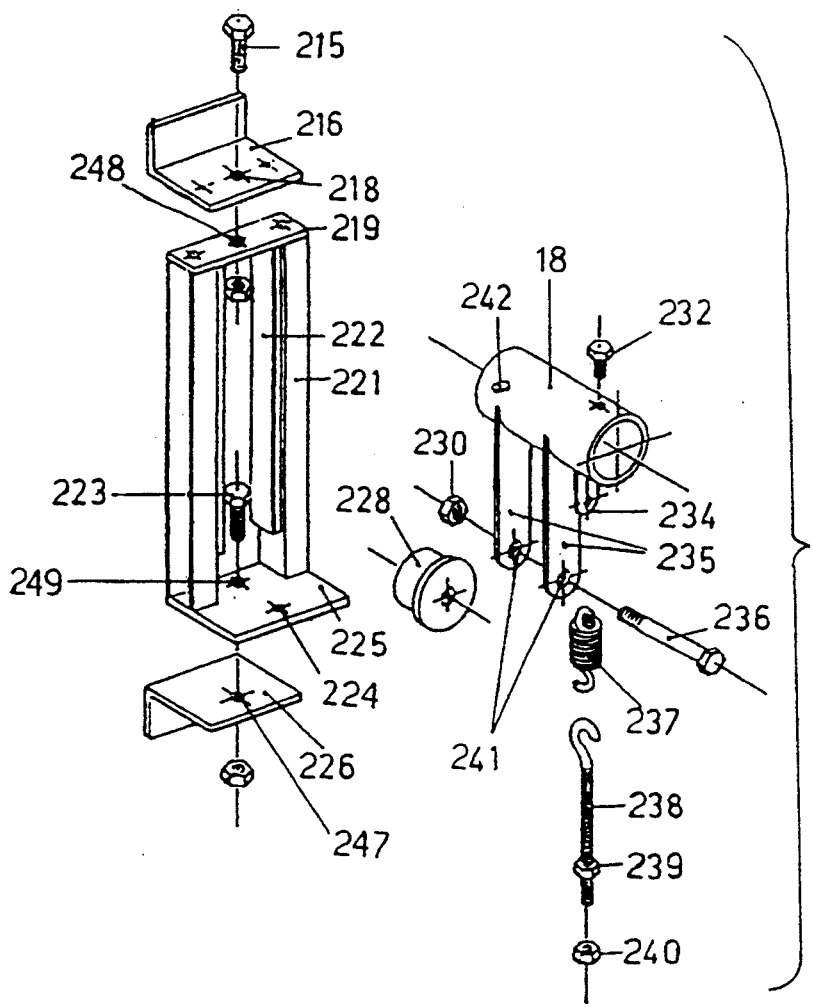
FIG. 13 is an exploded perspective view of the third embodiment, showing the connection of one of the side frames with the conveyor, with sliding guides, bush, spring with tensioning device and roll against turn over.

A scraping device according to a third embodiment of the invention, i.e. one adapted for cleaning the belt lower section, is illustrated in FIGS. 11, 12, 13.

As it is clear from such Figures, the positioning shaft 8 and the corresponding scraping blade are inclined with respect to the longitudinal axis of the belt 50, so as to allow the lateral removal of the material from the conveyor (FIG. 12).

The ends of the positioning shaft 8 are inserted into the side bushes 18 and rotated so that the scraper bits 1 perform their cleaning action downward, i.e. over the upper surface of the lower section of the belt 50, and then the shaft is fastened to the bushes by the pressure applied by the screws 232.

Each bushes 18 carries a pair of levers 235 at the lower ends of which a roll 228 against turn-over is applied by inserting the screw 236 into the holes 241 and tightening a nut 230.

The rolls 228 together with the bushes 18 are free to move over the associated guides 222, made of low friction polyethylene (or other material), and mounted to the side frames 221 connecting the device of the invention with the carpentry of the belt conveyor.

Stakes 242 protruding from each bush 18, by acting on the side edges 222 of the guides of both frames 221, prevent the component laying along the shaft 8 of the trust exerted by the material from causing undesired movements of the cleaning device.

The upper plate 216 and the lower plate 226, further to ensure the connection of the frames 221 to the carpentry of the conveyor, also allow for the rotation thereof about the axis of the screws 215 and 223 inserted in the pairs of holes 218–248 and 247–249 respectively, so as to impart the axis 8 the right inclination with respect to the longitudinal axis of the belt.

It is noted that in this application the tensioning system formed by a spring 237 upwardly connected to the lug 234 and downwardly to the end hook of a threaded shaft 238, which in turn is inserted in the hole 224 and is downward pulled when the nut 240 is tightened by acting on the lower face of the plate 225 and then is locked by the lock nut 239, has no effect in recovering the scraper wear (this action being carried out thanks to the weight of the device of the invention), but is provided for preventing undesired oscillations of the bushes 18 within the side guides.

A scraping belt device according to a fourth embodiment is illustrated in FIGS. 14, 15 and 16.

As clearly shown in such Figures, in this embodiment the scraping head comprises two parallel scraping units placed in series, each formed by a block 45 of polyurethane, rubber or other elastomeric material inside which a plurality of cores 51 are embedded that are parallel with each other but not in contact, as previously described in respect of the former embodiments.

From FIG. 16 it is clear that the mounting of said blocks 45 in the corresponding pockets 5, to which removable side frames g are fastened, is exactly the same as the one shown in FIG. 6 except that in this embodiment there are provided two blocks 45 instead of one.

It is noted that due to the manner by which each block 45 is fastened to the corresponding pocket 5 and to the presence of the resilient pad 4, the scraper bits 1 can elastically adjust to possible casual irregularities on the surface to be scraped and exert a pressure that increases from the side ends to the middle of the belt 50.

For the other individual features shown reference is made to the Figures illustrating the first embodiment.

More particularly, it is clear that the bending of the one-piece block could be achieved by replacing the resilient pad with an air tube or a series of springs having variable heights or also with a leaf spring.

It is to be understood that the invention is not to be limited to the illustrated and described embodiments, but several modifications and further improvements can be made to it without departing from the scope of the invention.

I claim

1. A scraping device for belt conveyors, comprising at least one scraping unit including a rotating positioning shaft; a housing pocket rigidly connected to said shaft; and a one-piece block of elastomeric material selected from the group consisting of polyurethane, rubber or other elastomeric material, a plurality of metal cores embedded inside said block and being located therein in parallel with each other but without being in contact with each other, said cores having tops carrying hard metal scraper bits, said cores extending along the length of the block with two end cores spaced from two respective ends of the block so that said two ends consist only of said elastomeric material; the block including a top portion having an ogival shape, a central body extending downwardly from said top portion, and two laterally extending protecting portions merging into said top portion, said central portion being provided at each end thereof with a hole for securing the block to a side frame of said housing pocket, a resilient pad of elastomeric material positioned in said housing pocket so that a lower edge of said central portion presses thereon, said pad having an upwardly curved upper profile; and means for adjusting a position of said unit with respect to a belt to be scraped, said means including bushes having recesses for supporting said rotating positioning shaft, locking means for locking the ends of the shaft in said bushes, and two support members, said bushes being elastically suspended through elastomeric springs with respect to said support members.

2. A scraping device for belt conveyors according to claim 1, wherein said block having the scraper bits is fixed to the housing pocket together with the resilient pad having an upward curved top edge to force the block to be bent upwardly so that the scraper bits embedded in said block are arranged along a broken line tangent to a curve of said edge; wherein a return to a straight configuration of the block when it is pressed against the belt being scraped by the elastomeric springs of suspension allows the scraper bits to apply an increased pressure in a belt central area, and thus improve a scraping action in area which is more prone to become dirty; the resilient pad operating as a cushion for the block and allowing the scraper bits to adjust to possible belt roughness or deformations.

3. A scraping device for belt conveyors according to claim 1, further comprising timbles and forks integrally connected therewith by screws and nuts for connecting said support members to said bushes, articulated arms provided on said bushes and carrying at opposite ends thereof said forks so as to form pivot hinges for rotating said positioning shaft, and bellows of elastomeric material mounted at two ends of each of said pivot hinges to protect said hinges.

4. A scraping device for belt conveyors according to claim 3, wherein the positioning shaft is swingable by the hinges and the corresponding articulated arms, the positioning shaft being cushioned by resilient suspension along a circular path with a center at an axis of the hinges and a radius equal to a distance between the axis of the hinges and an axis of the bushes, whereby interactions between the scraping device and the belt are elastically damped.

5. A scraping device for belt conveyors according to claim 1, wherein the springs are preloaded which allows for an automatic and continuous adjusting to wear of the scraper bits.

6. A scraping device for belt conveyors according claim 1, wherein for reversible belts, the positioning shaft is secured to frames provided with sliding guides of a low friction material; and further comprising levers and rolls located between the levers and connected thereto by screws and nuts and bolts are provided for preventing a turnover of said positioning shaft; said levers being pivotally connected to torsion springs by screws and nuts; wherein a scraper disengagement from a belt surface and subsequent return to a working position is obtained by said rolls inserted ; lower ends of said levers being integral with the springs of elastomeric material; and wherein lateral movements of said bushes are prevented by a protruding stake acting on side edges of a frame.

7. A scraping device for belt conveyors according to claim 6, wherein in addition to preventing the turnover of the shaft, the rolls and the levers allow for small elastic oscillations of the block about the positioning shaft through the torsion springs, thus cushioning interactions between the scraper bits and a moving belt.

8. A scraping device for belt conveyors according to claim 6, wherein the rolls connected to the levers and the related springs allow for a controlled disengagement of the scraper bits from the surface of the belt when a running direction of a belt conveyor is inverted and the return of the scraper bits to the working position when the original running direction of the belt is resumed.

9. A scraping device for belt conveyors according to claim 6, wherein a connection between the positioning shaft and a belt conveyor frame is such that said shaft is movable within the guides along a straight path, thus allowing an automatic and continuous adjustment of the shaft under a preloading force of the springs, for compensating for wear of the scraper bits.

10. A scraping device for belt conveyors according to claim 1, wherein the shaft carrying a blade-holder pocket is mounted on a section of the belt forming an angle with respect to a longitudinal axis thereof whereby a scraped material is laterally removed from the belt.

11. A scraping device for belt conveyors according to claim 1, wherein two scraping units are placed in series, each formed by said block; said units being housed in a scraping head.

12. A scraping device for belt conveyors, comprising a rotating positioning shaft; a housing pocket rigidly connected to said shaft; a one-piece block of elastomeric material selected from the group consisting of polyurethane, rubber or other elastomeric material, a plurality of metal cores embedded inside said block and being located in parallel with each other without being in contact with each other, said cores having tops which carry hard metal bits, said cores extending along the length of the block with two end cores spaced from two respective ends of the block so that said two ends consist only of elastomeric material; the block including a top portion having an ogival shape, a central body extending downwardly from said top portion and two lateral protecting portions; each of said two ends being provided in correspondence with the central body with a hole for receiving means for securing the block to a side frame of said housing pocket; a resilient pad of elastomeric material positioned in said housing pocket, the block having a lower edge pressing on said resilient pad of elastomeric material; said pad having an upwardly curved upper profile; the block being inclined with respect to a belt to be scraped and an inclination being adjustable by the positioning shaft; and means for adjusting a position of said shaft, said adjusting means including bushes having recesses for supporting said shaft, locking screws for locking ends of the shaft in said recesses in an adjusted position, elastomeric springs and support brackets having holes, said bushes being elastically suspended through said elastomeric springs to said support brackets; connection means provided between the elastomeric springs and the support brackets and including threaded shafts inserted into the holes in said support brackets and having first forks at ends thereof and timbles receiving said elastomeric springs and rendered integral with the first forks by screws and nuts; a preloding of the elastomeric springs being obtained by tightening nuts at the top of the support brackets, side brackets connecting a conveyor frame and having slots; slides adjustable along said slots and having projections; first brackets connected to said side brackets; second brackets integral with said slides; articulated arms integrally connected to said bushes and carrying on ends thereof second forks connected with said projections of said slides by pins inserted in holes provided in said second forks and split pins, thus forming pivot hinges; said hinges being protected by bellows of elastomeric material, mounted at two ends of each pivot hinge by straps; said pivot hinges being integral with said slides which are adjustable by loosening screws within said slots provided in the side brackets connecting the conveyor frame; wherein an adjustment of each hinge is obtained by tightening register screws inserted in threaded holes in said first brackets, ends of the register screws acting on said second brackets which are integral with the slides so that said slides can slide in said slots for positioning said hinges with respect to the belt to be scraped; said first brackets being connected to the side brackets by screws inserted in holes in said side brackets and tightened by nuts and washers.

* * * * *